Dec. 3, 1968   J. E. KIMBALL   3,413,734
SCREW FEED STABILIZER
Filed Jan. 24, 1967

INVENTOR.
JACK E. KIMBALL
BY
Woodhams, Blanchard & Flynn
ATTORNEYS

United States Patent Office 3,413,734
Patented Dec. 3, 1968

3,413,734
SCREW FEED STABILIZER
Jack E. Kimball, Fremont, Ohio, assignor to Borg-Warner Corporation, Chicago, Ill., a corporation of Illinois
Filed Jan. 24, 1967, Ser. No. 611,446
9 Claims. (Cl. 34—182)

ABSTRACT OF THE DISCLOSURE

This invention is comprised of a screw conveyor which has a collection chamber disposed at the discharge end thereof, whereby said chamber permits accumulation of plastic granules during operation such that same becomes filled and thereafter the plastic granules spill over the vertical forward wall or dam.

Introduction

This invention relates to an improved apparatus for feeding plastic granules to a consuming device and more particularly to an improved screw conveyor for delivery of plastic granules to a preheating unit.

A problem which has long existed and is well recognized in the batch unit production of plastic articles, involves the uniform delivery of the plastic granules to a preheater, such as the one shown in U.S. patent application Ser. Nos. 471,835 and 567,630, said latter application now U.S. Patent No. 3,373,502. Various attempts have been made to provide a uniform delivery. For example, a hopper was positioned directly above the preheater and the granules were dropped therefrom. The granules, it was found, sometimes slid more rapidly down one vertical side of the hopper than same did down the opposite side. This produced a deflection in the direction of the stream of granules such that one side of the preheating compartment would receive an excess of granules whereas there would be a deficiency on the other side of said compartment. A screw conveyor was later used and, although this was an improvement, still it was not entirely satisfactory. From an economic standpoint it is desirable to use as small a screw as possible and then to operate it normally at full or nearly full capacity. When such a screw was used, however, delivery was not uniform since when rotating rapidly it tended to throw material toward one side of the receiving means. The lack of uniformity was particularly noticeable during the period when the screw was starting up or slowing down inasmuch as the rotation of the screw was then variable in speed and this caused the granules to be thrown to one side of the preheating compartment in degrees varying with the rotational speed of the screw.

Such displacement was also substantially affected by the consistency of the plastic granules. For example, if the granules were adhesive they were found to be displaced much more than if they flowed easily. Thus, if the small screw was to be used, a means for adjusting the direction of flow was required and such adjustment would require constant attention.

Uniform delivery could be achieved if one utilized a large screw and operated same at a minimal speed. However, this was found to have other inherent disadvantages such as the fact that a greater financial investment was required and this was important since the cost of such screws rises rapidly as the sizes increases. Another disadvantage stems from the fact that the larger screw contained a larger amount of plastic granules. Some kinds of such granules, it is well known, tend to fuse and solidify if allowed to stand for any period of time and thus must be removed whenever the machine is shut down. Also, all plastic granules must be removed when the operation is being changed from use of one type of plastic to the use of another type. Therefore, the larger the screw the more plastic that must be removed at shut down or changeover.

Therefore, the objects of the present invention include:

(1) To provide a screw conveyor for delivery of plastic granules to a device such as a preheater whereby the delivery will be made in a uniform manner.

(2) To provide a screw conveyor, as aforesaid, which will discharge in a transversely evenly distributed manner at any speed.

(3) To provide a screw conveyor, as aforesaid, which will discharge in a transversely evenly distributed manner even though the conveyor speed is being varied.

(4) To provide a more economical feeding device.

(5) To provide a screw conveyor which will operate satisfactorily at a maximum rotational speed.

(6) To provide a conveyor, as aforesaid, which does not require a means for adjusting the direction of discharge.

(7) To provide a conveyor, as aforesaid, which can be utilized at full speed so as to require only a minimum size whereby granules may be easily removed at shut down or changeover.

Further advantages will become obvious to those skilled in the art of plastic molding upon reading the following detailed description and upon examination of the accompanying drawings.

Detailed description

Figure 1:
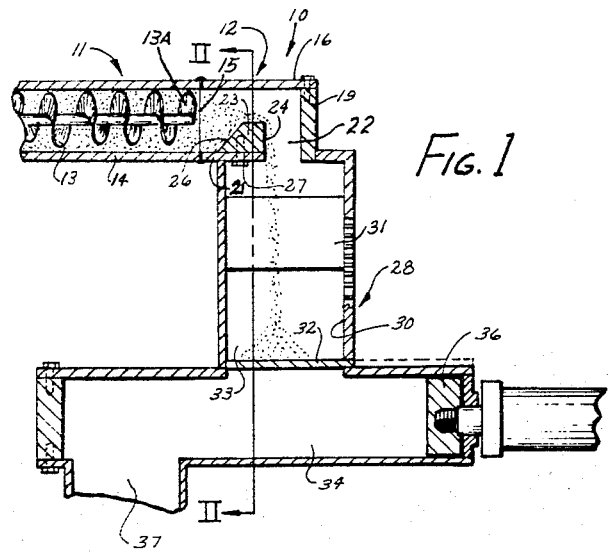
FIGURE 1 illustrates a sectional view of the invention.

The plastic feeding device 10, of which FIGURE 1 shows a preferred embodiment, is comprised of a screw conveyor unit 11 and a collection chamber 12.

The screw conveyor unit 11 is of a conventional construction having a screw 13 which is caused to rotate within a cylinder 14 by any conventional means, not shown. The size of the screw conveyor unit 11 will depend upon the maximum delivery rate of plastic granules required. This maximum delivery, however, can be measured while the screw 13 is operating at full speed, the latter being limited only by mechanical considerations such as its bearings or the heating effect on the plastic granules. The collection chamber 12 is disposed at the discharge end of the screw conveyor unit 11, said discharge end being defined by the end 13A of the screw conveyor 13 positioned within a discharge opening 15 formed within the cylindrical housing 14. Although the collection chamber may be of nearly any shape, such as cylindrical, in FIGURE 2 it is shown as being rectangular. Said chamber has an upper wall 16 and a pair of side walls 17 and 18, the rear of said chamber defining an opening for reception of the plastic granules from the discharge end of said screw conveyor unit 11. At the forward end of the top wall 16 and side walls 17 and 18 is located the forward wall 19. The lower wall 21 is shorter in length than said top and side walls, thereby providing a discharge zone 22 opening downwardly. Adjacent the forward edge of lower wall 21 and extending upwardly therefrom is vertical restraining wall or dam 23. The forward surface 24 of said restraining wall preferably is perpendicular to said bottom wall 21 whereas the rear surface 26 preferably slopes rearwardly. Restraining wall 23 may be attached by any convenient means to lower wall 21, such as by screw 27 or by welding. The height of the restraining wall 23 and the size of the discharge zone 22 will depend to a certain extent upon the types of plastic granules which are to be handled.

The greater the adhesiveness between the granules, the higher must be the restraining wall 23 and the larger must be zone 22. The size of the restraining wall 23 and the size of said zone should be provided sufficiently to accommodate the most tenacious granules since these factors will not adversely affect the handling of less tenacious granules to any noticeable extent.

*Operation*

Although the operation of the invention is indicated somewhat above, it will now be more fully explained in order to ensure more complete understanding of the invention.

Plastic granules are fed into the screw conveyor 11 from a storage bin or hopper which is not shown. As said conveyor transports the granules forwardly they accumulate in the area between the forward end of said conveyor and, the rear surface 26 of the restraining wall 23. As this area becomes full, the granules spill over said wall and fall vertically. More granules are pushed forwardly and they enter the accumulation area below the upper surface of the granules and therefore any lateral movement produced by the rotation of the screw is destroyed. The granules may fall after spilling over the restraining wall into a preheater 28, such as the one illustrated in U.S. Patent No. 3,163,888 for further handling.

The preheater 28 is shown for illustrative purposes only. In general, heated air is forced into the preheating compartment 30 through openings 31 thereby heating the plastic granules to an appropriate temperature. Gate 32 at that time is retracted from the opening 33 by a means not shown and the heated granules are permitted to fall downwardly through opening 33 into passage 34. Piston 36 is then operated to push said granules leftwardly until the granules drop through passage 37 into a consuming device such as injection molding equipment or extrusion equipment.

*Modification*

Figure 3:
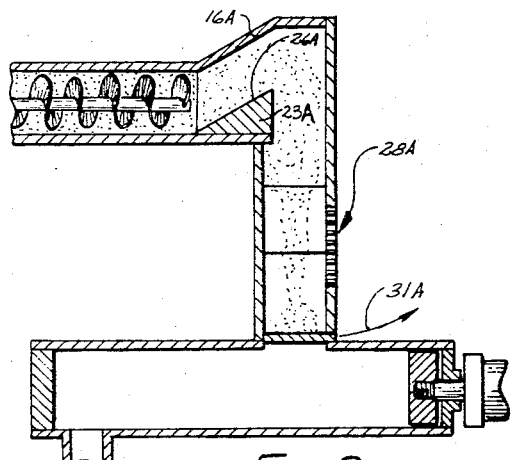
FIGURE 3 shows a modification of the invention.

In some instances, particularly where very tenacious plastic granules are being handled, it may be desirable to eliminate the restriction that would exist between the rather high dam 23 and the upper wall 16. This may be done, as shown in FIGURE 3, by providing an upper wall 16A which is parallel with the rear surface 26A of the restraining wall 23A, thereby providing a passageway of substantially equal size throughout.

Figure 2:
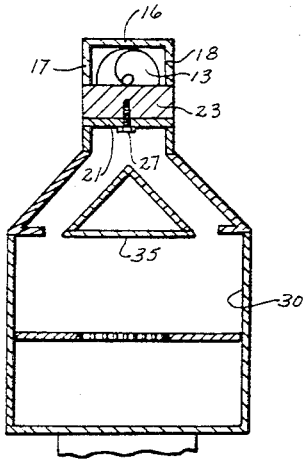
FIGURE 2 shows a sectional view taken along the line II—II of FIGURE 1.

A divider 35 is shown in FIGURE 2 and same will be desirable where the preheating compartment 30 is wider than the feeding unit 11. However, for instances where the compartment 30 is of width substantially equal to that of the feeding unit 11, the divider 35 may be omitted and the smooth flow of plastic over the dam 23 can be relied upon to distribute the material evenly within said compartment 30.

Although particular preferred embodiments of the invention have been disclosed above in detail for illustrative purposes, it will be understood that variations or modifications of such disclosure, which do not depart from the scope of the appended claims, are fully contemplated.

The embodiments of the invention in which an exclusive property or privilege is claimed are defined as follows:

1. A device for the delivery of plastic granules comprising:
    conveyor means for transporting plastic granules and for discharging same through a discharge opening, said conveyor means including a housing and a screw conveyor having a discharge end thereon rotatably positioned within said housing;
    accumulation chamber means in communication with said discharge opening for receiving plastic granules therein, said accumulation chamber means having a discharge zone; and
    dam means disposed between the discharge end of said screw conveyor and the discharge zone of said accumulation chamber for causing plastic granules to accumulate to a predetermined depth behind said dam means before permitting granules to be conveyed over the top of said dam means to said discharge zone, said dam means including a vertically extending wall having a downwardly sloping rear surface thereon confronting the discharge end of said screw conveyor with said granules accumulating adjacent said sloping rear surface, said vertically extending wall extending upwardly to a height substantially above the lowermost point of said screw conveyor.

2. The device defined in claim 1, wherein said accumulation chamber means includes sidewalls, a forward wall adjacent and extending between said side walls, a lower wall adjacent and extending between said sidewalls, said lower wall terminating at an edge which is laterally spaced from said forward wall so as to define a downwardly facing outlet opening, said vertically extending wall being positioned on said lower wall adjacent the terminal edge thereof and extending between said sidewalls, said vertically extending wall having a forward surface thereon laterally spaced from said forward wall so as to define said discharge zone therebetween with said discharge zone being in communication with a downwardly facing outlet opening.

3. The device defined in claim 1, wherein said accumulation chamber means includes a pair of sidewalls and an upper wall positioned adjacent and extending between the side walls, said upper wall having a portion adjacent to and in substantially parallel relationship to the rear surface of said dam means whereby the entire passageway through said accumulation chamber means is of substantially equal cross-sectional area.

4. The device defined in claim 1, wherein said screw conveyor is positioned substantially horizonally and the discharge end thereof is substantially laterally spaced from the sloping rear surface of said dam means, and wherein said accumulation chamber means includes sidewalls and a lower wall interconnected to said housing as the discharge opening thereof with said sidewalls and lower wall defining a passageway through said accumulation chamber means, said vertically extending wall being positioned adjacent the edge of said lower wall and extending between said sidewalls, and said accumulation chamber means further having a forward wall extending between said sidewalls laterally spaced forwardly from the edge of said lower wall and from said vertically extending wall so as to define said discharge zone therebetween with said discharge zone opening downwardly, whereby said screw conveyor causes plastic granules to accumulate behind said dam means adjacent the downwardly sloping rear surface thereof until the particles reach a depth substantially equal to the height of said dam means whereby the particles spill over the top of the dam means and fall downwardly through the discharge zone.

5. The device in claim 4, wherein divider means are positioned adjacent the outlet end of said discharge zone for dividing the flow of plastic granules.

6. The device defined in claim 1, wherein said discharge opening extends substantially vertically and is positioned adjacent the discharge end of said screw conveyor, said accumulation chamber means having wall means interconnected to said housing adjacent said discharge opening with said wall means defining a downwardly opening discharge zone laterally displaced from said discharge opening, said wall means also defining a passageway interconnecting said discharge opening to said discharge zone with said vertically extending wall being positioned within said passageway, said vertically extending wall having a substantially vertical forward surface confronting and partially defining said downwardly opening discharge zone whereby said granules freely fall downwardly through said discharge zone after passing over said vertically extending wall.

7. The device as defined in claim 1, wherein the discharge end of said screw conveyor terminates at a distance spaced from said vertically extending wall so as to define region therebetween in which said granules accumulate to said depth, the discharge end of said screw conveyor being free of direct connection to said vertically extending wall.

8. The device defined in claim 2, wherein said discharge zone is positioned directly above said outlet opening whereby said granules freely fall downwardly therethrough.

9. A device as defined in claim 8, wherein a preheater is adjacent to and directly below said discharge zone whereby said freely falling granules fall directly into said preheater.

References Cited

UNITED STATES PATENTS

| | | | |
|---|---|---|---|
| 2,554,796 | 5/1951 | Runninger | 198—213 |
| 2,743,860 | 5/1956 | Saxe | 198—213 X |

FOREIGN PATENTS

| | | |
|---|---|---|
| 689,181 | 5/1930 | France. |
| 699,962 | 11/1953 | Great Britain. |
| 710,306 | 6/1954 | Great Britain. |

EDWARD A. SROKA, *Primary Examiner.*

M. L. AJEMAN, *Assistant Examiner.*